April 7, 1970 R. W. MILLER 3,504,637
OPEN TOP RAILROAD CAR HAVING A REMOVABLE ROOF STRUCTURE THEREFOR
Filed Sept. 1, 1967 4 Sheets-Sheet 1
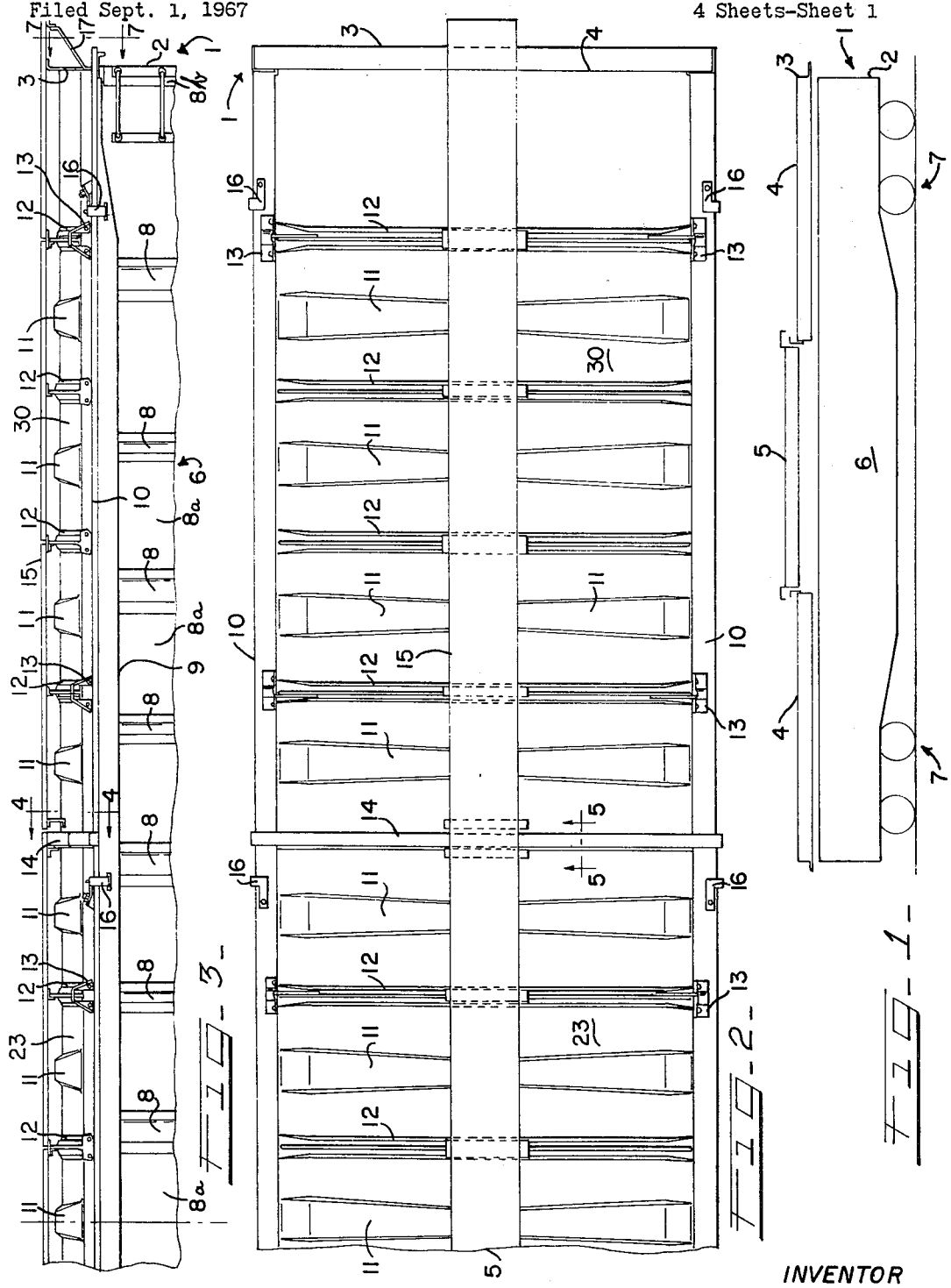
INVENTOR
ROY W. MILLER
BY Richard J. Myers
ATT'Y.

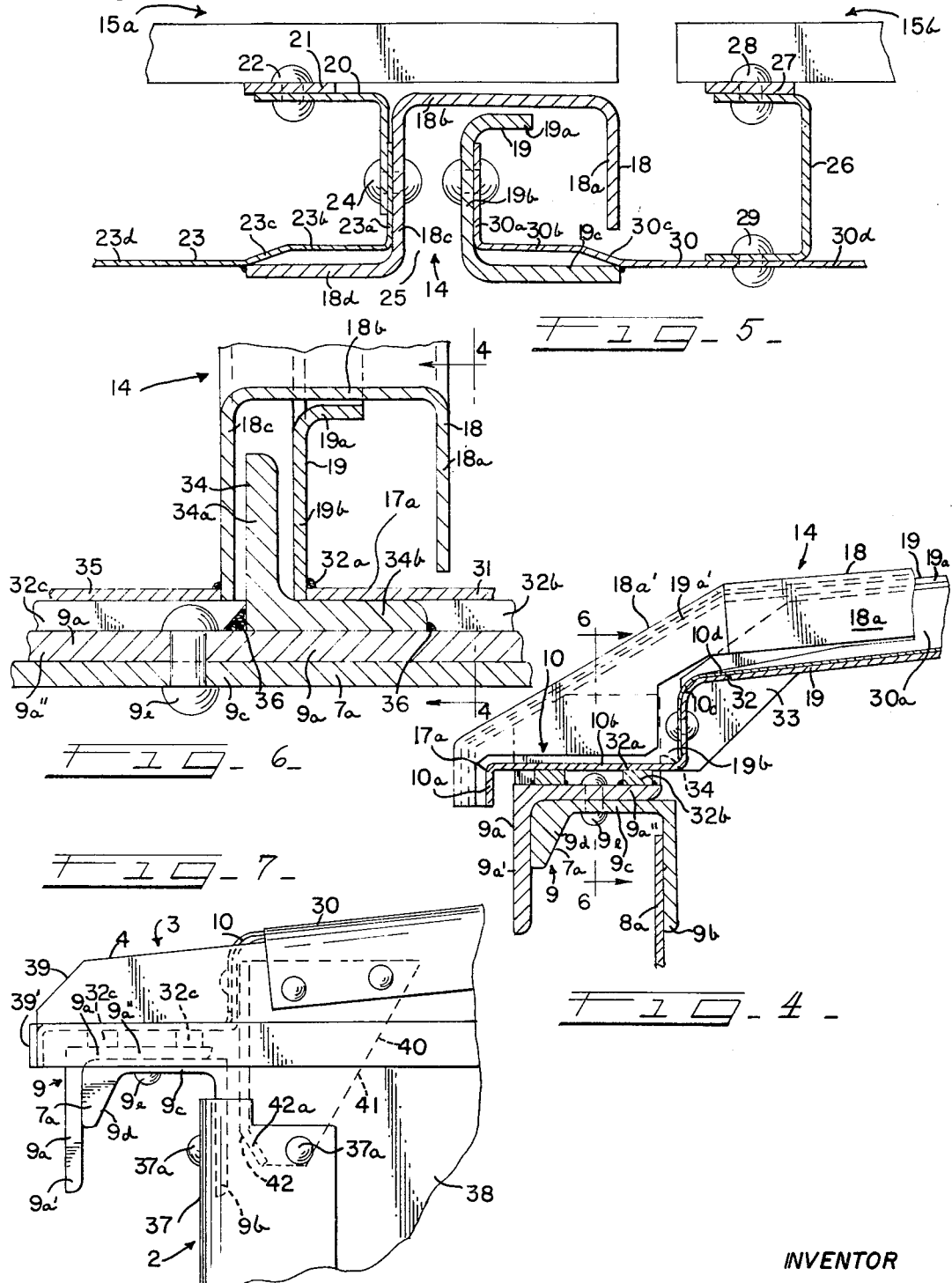

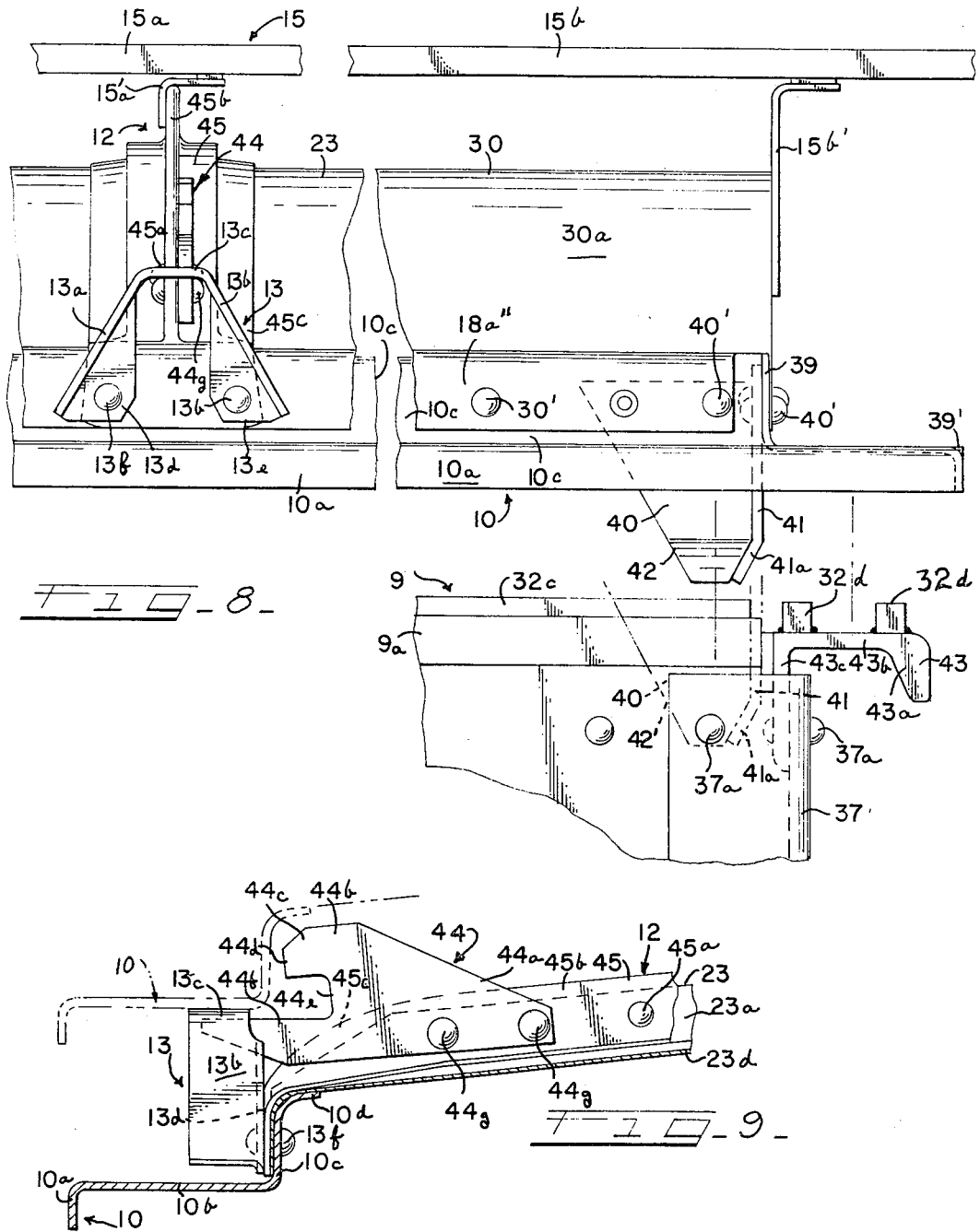

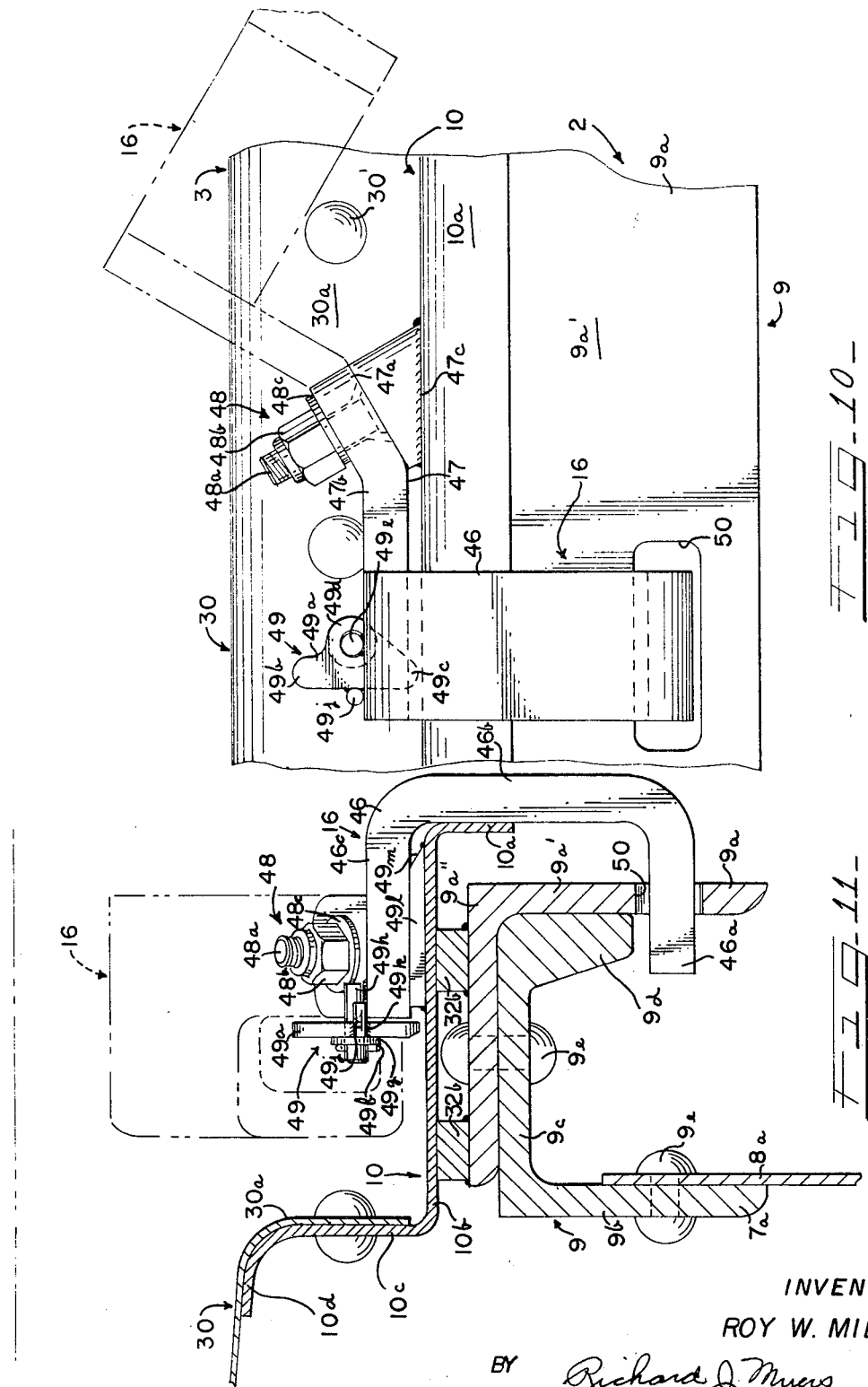

United States Patent Office 3,504,637
Patented Apr. 7, 1970

3,504,637
OPEN TOP RAILROAD CAR HAVING A REMOVABLE ROOF STRUCTURE THEREFOR
Roy W. Miller, Highland, Ind., assignor to Pullman Incorporated, Chicago, Ill., a corporation of Delaware
Filed Sept. 1, 1967, Ser. No. 665,071
Int. Cl. B61d 39/00
U.S. Cl. 105—377                                16 Claims

ABSTRACT OF THE DISCLOSURE

A removable roof structure on a gondola railroad car having an open top wherein the roof structure comprises a plurality of separable roof sections releasably held together by a splice carline roof overlapping arrangement and wherein is provided on each roof section, roof section stacking structure for mounting one roof section upon the other for storage and wherein the splice structure receives a stop mounted on the car and the corner of the roof end section is provided with a corresponding cooperating corner stop or stake to limit movement of the roof sections when placed atop the open car structure and wherein there is provided roof locking means on the roof sections and on the open top car portion for locking of the roof sections as a unit on the open top car body.

BACKGROUND OF THE INVENTION

Field of invention

This invention relates to railroad cars and in particular to railroad cars that have an open top car body such as in the case of gondola cars or hopper cars wherein there are provided roof cover means to protect the lading stored within the car. In some instances it is desired to leave the gondola car uncovered where in other instances it may be desired to put a cover or roof on top of the gondola car. A removable type gondola roof or the like would satisfy both types of requirement and it is in this area that the invention is particularly directed wherein the gondola roof may be removed from the open car in sections that overlap with one another and are held down by suitable securing means and wherein structure is provided to prevent the roof sections from falling off the car. Also for on-to-off roof operations there should be provided means for storing of the roof sections.

Description of prior art

Many types of removable gondola roofs have heretofore been devised that are formed by a plurality of roof sections but sealing of the sections to prevent moisture and undesirable particles from leaking in from the roof section has always presented a problem. Further, lifting and storing of the sections has presented further difficulty, as has proper alignment of the roof sections atop the open car portion. Further, a proper locking arrangement for adequately securing the roof to the gondola car has been desired, particularly a type of lock arrangement which would permit easy and quick engagement or disengagement of the roof sections from the car.

SUMMARY

This invention relates to an improved railroad car structure of the open roof type adapted to receive a removable roof structure comprising a plurality of separable roof sections held together by novel splicing members and assembled over the top of the car and held in place by corner stops or stakes, the roof structure being provided with locking structure to cooperate with locking structure on the car, each of the roof sections being provided with roof stacking mounts to permit stacking of the roof sections either on the ground or on the car itself. The roof stacking mount is of an A type structure coupled with the combination reinforcement and lifting hook to form a rigid mount that is so designed as to permit "nesting" of the other roof sections when stored. The inclined surfaces at the ends of the splice members permit self-alignment of the roof sections when put in place. The roof section being lowered would strike the inclined plane of the roof section already in place and slide down the surface until it aligned itself for proper placement. The corner stop or stake aids in placement of the roof end sections to the car since the stops or stakes extend below the roof sections and have double lead surfaces to help guide the roof sections for proper placement. The simplified roof locking arrangement that operates on a "swing pivot" permits quick and easy engagement or disengagement of the roof sections from the car. The lock structure may be opened simply by rotating the pawl aside with one finger and pulling the latch out and upward. The latch remains atop the side plate in the open position permitting the roof section to be lifted without further handling of the latch being required. The open profile is low enough to permit the stacking of the next section without interference with the side plate. When locking, all that is necessary is to swing the latch to the closed position. The latch pawl will engage the inclined plane and lock automatically. The arrangement also contemplates roof drainage structure.

These and other objects, advantages and purposes will become apparent from reference to the following description of the drawings and the preferred embodiment.

BRIEF DESCRIPTION OF THE DRAWINGS

FIG. 1 is a side elevational view of the gondola car employing the novel removable roof structure;

FIG. 2 is a top plan view of a portion of the novel roof structure of the gondola car;

FIG. 3 is a partial elevational view of the top of the gondola car carrying the removable roof section;

FIG. 4 is a partial view taken along line 4—4 of FIG. 3;

FIG. 5 is a longitudinal sectional view showing the novel splice carline structure;

FIG. 6 is a sectional view of the carline structure taken along line 6—6 of FIG. 4;

FIG. 7 is a partial end view section of the car roof and car body;

FIG. 8 is an enlarged elevational view of the end of the car and roof section illustrating the stacking structure and the roof stake structure;

FIG. 9 is a sectional view taken transversely of the car and illustrating the novel stacking and book structure of the roof;

FIG. 10 is a partial longitudinal sectional view of the roof and car body locking structure; and FIG. 11 is a transverse sectional view of the roof and car body locking structure.

DESCRIPTION OF THE PREFERRED EMBODIMENT

With reference now to the drawings and in particular with reference to FIGS. 1–3 there is shown a gondola car 1 having an open car body 2 and a car roof 3. The car roof has two car roof end sections 4, 4 and a car roof middle section 5. The open car body 2 is provided with a gondola side 6 and the trucks 7, 7 supporting the body which has a plurality of side post structures 8 supporting side sheets 8a. The car body 2 also has a ladder 8b and a side top chord structure 9. The roof sections 4, 5 are provided with roof side plate means 10 and roof corrugated stiffeners 11 and roof top seam cap structures 12, stacking frame structures 13, roof section splice structures 14, a running board or walk 15, roof lock structure 16, and a running board end bracket 17.

FIGS. 4, 5 and 6 are illustrative of the novel roof section splice structure 14 which comprises a middle roof section splice carline unit 18 and an end roof section splice carline unit 19 attached to the respective middle roof section 5 and the end roof sections 4 for coupling of the respective roof sections to one another. The carline unit 18 comprises an angle shape beam structure 18 having a downwardly extending weather protecting cover or arm 18a which connects with an upwardly horizontally extending beam portion 18b that connects with downwardly extending beam structure 18c paralleling beam portion 18a and connecting with lower horizontally extending beam portion 18d. The carline structure for the roof end section comprises a similarly transversely extending elongated beam structure 19 having a shortened horizontal upper arm portion 19a, a vertically extending portion 19b and a lower horizontally extending beam portion 19c, as seen in FIG. 5. The roof beam structure 19 which is generally C-shaped in form is somewhat enclosed by the beam structure 18 but define with one another a maze-type path for inhibiting or preventing foul weather or undesirable particles from entering between the splice sections, the splice sections being sloped downwardly toward the side of the car as shown by the respective portions 18a' and 19a' in FIG. 4. A trough area 17a for moisture and the like run-off is between beam portions 19b and 18a as shown in FIG. 6. The running board section 15a of the running board 15 is attached by rivet means 22 and filler plate 21 which is attached to a mounting saddle held to beam structure 18 by rivet means 24 which also tacks on the roof sheet 23 of the middle roof section and having roof sheet portions 23a, 23b, 23c and 23d which sheet 23 is welded to the end of the beam portion 18 and extends outwardly therefrom. Similarly, the running board section 15b of the running board 15 is fastened to the saddle 26 by way of the plate 27 and rivet 28 and rivet 29 to the end section roof sheet 30 having portions 38 attached by rivet means to the vertically extending beam portion 19b and is connected at the end of beam portion 19c and held to the saddle 26 by rivet means 29 and has its end sheet portion 30d extending therefrom to cover the roof as is the case with the middle roof section 23d. As seen in FIG. 6 the beam portion 18c of the carline 18 is welded to the roof side plate 35 for the middle section and the carline 19 has its portion 19b welded to the roof side plate 31 of the end section and the roof stop 34 being L-shaped and having upright portion 34a and horizontal portion 34b with welds 36 tying same to the side top chord structure 9. It will be noted that the carlines 18 and 19 are separated by a space or opening 25 from one another as seen in FIG. 5 which is relatively free from foreign material. In In such a manner the carline sections may be placed over one another for assembly of the roof sections together into a one piece structure but may be removed from one another for stacking in a stored condition. The roof side plate elements 31 and 35 of the end and center sections form the side plate structure 10. The roof stop structure 34 that is fixed on the side top chord structure 9 limits longitudinal movement of the roof sections in that it is disposed between the upright portions 18c and 19b of the carline structures 18 and 19 and cooperates in this regard with the end stops or stakes 40 to be later described. As shown in FIGS. 4, 6 and 7 the side top chord structure of the open car body 2 comprises a top chord reinforcement structure 9a which has depending portion 9a' and horizontal portion 9a" between filler elements 32c and 9c. Plate portions 31 and 35 are welded at 32a to the carline structures 18 and 19. The side top chord structure also includes the side chord 7a having a bulk portion 9d and a horizontal portion 9c held by rivet means 9e to the top chord reinformement member 9a and is further provided with another depending chord portion 9b riveted to the corner post 37 by the rivet means 37a as shown in FIG. 7. As shown in FIG. 4 the side sheet 8a is fastened to the chord portion 9b. Also in FIG. 4 it is seen that the horizontal beam portion 19c of the carline 19 is welded at 32 to the roof side plate structure 10 having portions 10a, 10b, 10c and 10d, as seen in FIG. 4, the cross sectional edge of the side plate structure portion 10b being divided into side plate sections 35 and 31 shown only partially in FIG. 6. As seen in FIG. 4, a side plate reinforcing gusset 33 is provided for the weld juncture 32. As seen in FIGS. 4 and 8 the splice carline 18a, in addition to being provided with the slope portion 18a', is also provided with a depending skirt portion 18a" and the depending side plate portion 10a as seen in FIG. 4. The run-off channel to allow moisture and the like to leave the side of the roof of the car is between parts 19b, 18a on section 31. As previously mentioned, the welds 36, as shown in FIG. 6, tie the stop element 34 to the side plate structure 9.

The corner post plate 37 of the car body portion is provided with rivet means 37a for holding the side sheet 8a thereto, as seen in FIG. 7, and rivets 37a also hold the car body and end wall sheet 38 to the corner post structure 37, see also FIG. 8. With reference now to FIGS. 7 and 8, there is provided a corner stop or stake means 40 held by rivet means 40' to the inner end portions of the corner roof sections, namely the end roof plate structure comprising upright and horizontal portions 39 and 39' which are attached to the portions of the end section roof sheet 30 and to the roof side plate structure 10. The end roof stake structure 40 is provided with corner stop end plate 41 and corner stop side plate 42 each having taper portions 41a and 42a respectively as seen in FIGS. 7 and 8, the corner stake structure 40 nesting into the corner of the open car portion as shown in dotted line in FIG. 8, the rear end of the corner of the car portion 2 being provided with end top chord 43 carrying filler plates 32d, 32d and having portions 43a, 43b and 43c mounted on the end of the car portion 2 for receiving the end roof plate structure portions 39, 39' as shown in FIG. 8. The corner stake structures 40 which are located at each corner of each end roof section cooperate with the stop structure 34 mounted on the car portion 2 (see FIG. 6) to prevent moving of the intercoupled intermediate roof section 5 with the car roof end sections 4, 4. The stake arrangements 34 and 40 cooperate with the slope portion of the end and middle roof sections to neatly nest the entire roof structure on the gondola car lower portion 2.

The stacking structure 13 is placed at a plurality of positions on either side of the car roof both on the intermediate car roof section 5 and on each of the end sections 4 so that the roof sections can be stacked one upon the other. As seen in FIGS. 8 and 9 the stacking frame structure 13 comprises two diagonally extending generally upright portions and 13a and 13b interconnected by a horizontal top portion 13c, with legs 13d and 13e extending from the portion 13a and 13b and carrying rivet means 13f for attaching the same to the roof top seam cap structure 12 holding the sheet sections 23 or 30 together. The seam cap structure 12 comprises a U-shaped transversely extending cap element 45 held to the intermediate sheet 23 by rivet means 45a and which cap element comprises portions 45b and 45c and attaches to angle plate 15a' which is attached to the running board section 15b of the running board 15. The lateral anti-shift and roof section element or hook structure 44 comprises a plate structure having slope portion 44a and top portion 44b and hook receiving portions 44c, 44d, 44e and 44f, the latter of which extends to and contacts with the stacking structure 13. A hook from a crane may enter the recess portion 44e of the hook element 44 for lifting a respective roof section 4 or 5 off of the gondola car. Because of the construction of the carline structures 18 and 19 the middle roof section must be removed before the end sections can be removed.

With reference now to FIGS. 10 and 11 there is shown the lock structure 16 for tying of the roof sections 4 and 5 to the car body 2. The lock structure 16 comprises a roof lock latch 46 in the form of a U-shaped upright standing member having a car entrant portion 46a horizontally extending through the top chord structure 9a by way of aperture 50 and has an upstanding portion 46b and a horizontal portion 46c to define a C-shaped structure. The upper arm portion 46c of the latch 46 is provided with a longitudinally extending arm portion 47 having a pivot portion 47a and a connection portion 47b at angles thereto to provide for upward swinging movement of the latch 46 into the dotted line position shown in FIGS. 10 and 11. The arm portion 47c forms a pivotal journal and rotates about the pivot pin means or pivot structure 48 comprising a screw or rod portion 48a containing nut means 48b thereon and held against washer 48c which seats on the arm 47a. A latch or lock pawl structure 49 is fixedly attached to the arm 46c and comprises a pivotal latch portion 49a formed with over-center end arm portions 49b and 49c with a journal portion 49d rotatively supported on shaft portion 49e fixedly attached to the arm portion 46c, the portions 49b, 49c carrying fixedly thereto and intermediate thereof fixed pin 49j welded to the element 49a and resting against the top of the latch arm 46c, the ears 49b and 49c acting as a counter-balance weight to keep the underside 49h of the pin 49j atop the surface of the arm 46c, the washer 49g holding the shaft portion 49e to the counterweight 49a, the pin 49f holding the washer 49g on the shaft 49e allowing the counterbalance 49a to swing about its pivot 49e held to the arm portion 46c with the lower end of the counterweight 49c when in the down position shown in dotted line in FIG. 11 is prevented from movement outwardly by the lug 49l fixedly mounted on the roof side plate 10. Thus it is seen that the lock arrangement 16 is carried entirely by a particular roof section 4 or 5 with the exception of the aperture 50 in the top chord reinforcement portion 9a and in order for the latch arm 46a to be removed outwardly about its pivot portion 47a the counterweight 49a must first be rotated clockwise as seen in FIG. 10, to remove ear 49c out of obstructing position with respect to the lug 49l on the roof side plate 10.

It is therefore seen that there is provided a novel splice carline arrangement of overlapping splice structure 18 and 19 of the roof sections 4 and 5 to permit removal of the middle roof section before the end sections can be removed and wherein stop means 34 on the car body portion 2 and end stake structure 40 on the end of the end sections 4 of the roof 3 in combination with the slope portions of the splice carline and roof sections including the roof sheets permit proper alignment of the roof sections on the car body and permit removal of the roof section from the car body. The stacking structure 13 permits stacking of one roof section upon the other as shown in dotted line in FIG. 8 and the hook has a low profile to lear the roof sections stacked above it and the hook structure 44 permits a crane to remove the roof sections from the car. The lock structure for attaching each of the roof sections to the car body has a low profile so that it does not interfere with the stacking elements for storing one roof section upon the other as seen in dotted lines in FIG. 4 and the roof locking structure is carried by the roof section and removed from a solid line locked position to a dotted line unlocked position as shown in FIGS. 10 and 11 and by a simple movement with the finger or a rod the counterbalance weight may be moved to unlatch the lock arrangement for removing the roof sections from the car body portion.

The foregoing description and drawings merely explain and illustrate the invention and the invention is not limited thereto, as those skilled in the art who have the disclosure before them will be albe to make modifications and variations therein without departing from the scope of the invention.

What is claimed is:

1. A removable roof assembly for an open car body for a railroad car comprising:
   a roof structure having intermediate and end roof sections that are releasably coupled with one another,
   one of said roof sections comprising a first splice carline,
   said splice carline comprising an upper generally horizontal portion and inner and outer downwardly depending portions connecting with the horizontal portion,
   said other roof section having a second splice carline comprising a generally upstanding portion and a generally short upper horizontal portion,
   said second carline being generally encompassed by the first carline,
   the horizontal portion of the first carline being spaced slightly above the horizontal portion of the second carline to present a water blocking barrier, said outer depending portion of the first carline defining with the upstanding portion of the second carline a moisture entrapping trough area for conducting the moisture from the carline sections, and
   said end sections of the roof being provided with depending corner stake means for reception inside the end corner section of the car body for limiting longitudinal movement of said intercoupled car sections.

2. The invention according to claim 1, and
   said inner depending portion of the first carline section defining with the upstanding portion of the second carline section a space for receiving a car body mounted stop for limiting longitudinal movement of the intercoupled roof sections.

3. The invention according to claim 1, and
   each of said roof sections having longitudinally extending downwardly sloping side sheet portions adapted to extend over the open car body whereby the roof sections may be held in a generally fixed position on the car, the sloping side sheets limiting lateral movement of the intercoupled roof sections.

4. The invention according to claim 3, and
   each of said roof sections carrying roof to car body locking means, said locking means comprising a depending rotatable latch having a part thereof adapted to be received in an associated aperture on the car body and having an upper portion pivotally carrying an over-center counterweighted pawl provided with pin means engageable with the upper portion for limiting rotation of the pawl, the lower end of said counterweighted pawl being adapted to hang over a portion of the roof section to limit outward movement of said latch, said latch being pivotally carried by said roof section by an arm bent at an angle to allow outward upward movement of said latch away from the car body aperture upon pivotal movement of the counterweighted pawl in one direction about the pivotal connection of the counterweighted pawl to the upper latch portion to remove the lower part of the counterweighted pawl from obstruction position with respect to said roof section portion.

5. The invention according to claim 1, and
   roof stacking means located on each of said sections and comprised of upright extending member having an upper outboard section for receiving an associated roof section thereover for stacking of one section upon the other.

6. The invention according to claim 5, and
a hook receiving element mounted on a roof section for lifting the roof section relative to another roof section by the use of such means as a crane hook, said hook receiving element having a hook portion for receiving said associated crane hook and having a low profile surface extending above said upright extending member of said stacking means for receiving said hook and having a portion engageable with said stacking arm portion for support of said hook in raising of one said roof sections.

7. The invention according to claim 1, and
said first splice carline comprising a generally inverted U-shaped portion and second splice carline comprising a generally C-shaped portion.

8. A removable roof assembly for an open car body for a railroad car comprising:
a roof structure having intermediate and end roof sections that are releasably coupled with one another,
one of said roof sections comprising a first splice carline,
a second carline being generally encompassed by the first carline,
each of said roof sections having longitudinally extending downwardly sloping side sheet portions adapted to extend over the open car body whereby the roof sections may be held in a generally fixed position on the car, the sloping side sheets limiting lateral movement of the intercoupled roof sections, and
each of said roof sections carrying roof to car body portion locking means, said locking means being carried by said slope sheet portion and comprising a depending rotatable latch having a part thereof adapted to be received in an associated aperture on the car body and having an upper portion pivotally carrying an over-center counterweighted pawl provided with pin means engageable with the upper portion for limiting rotation of the pawl, the lower end of said counterweighted pawl being adapted to hang over a portion of the roof section to limit outward movement of said latch, said latch being pivotally carried by said roof slope sheet section by an arm bent at an angle to allow outward upward movement of said latch away from the car body aperture upon pivotal movement of the counterweight in one direction about the pivotal connection of the counterweighted pawl to the upper latch portion to remove the lower part of the counterweighted pawl from obstruction position with respect to said roof section.

9. A removable roof assembly for an open car body for a railroad car comprising:
a roof structure having intermediate and end roof sections that are releasably coupled with one another,
one of said roof sections comprising a first splice carline,
a second carline being generally encompased by the first carline in overlapping relation,
each of said roof sections carrying roof to car body portion locking means, said locking means comprising a latch having a part thereof adapted to be received in an associated aperture on the car body and having an upper portion pivotally carrying a pawl provided with means for limiting rotation of the pawl, the pawl being adapted to hang over a portion of the roof section to limit outward movement of said latch, said latch being pivotally carried by said roof section to allow outward upward movement of said latch away from the car body aperture upon pivotal movement of the pawl in one direction to remove the lower part of the pawl from obstruction position with respect to said roof section.

10. The invention according to claim 1, and
each of said roof sections being provided with roof section stacking elements connecting with the roof section and extending thereabove and having an upper surface for receiving an associated roof section for stacking therewith, and
said surface of said stacking structure holding the roof above an associated locking structure when the latter is in the raised position.

11. The invention according to claim 10, and
said roof section having a hook receiving arm adapted to have an upper surface to extend below said stacking element so that one roof section may be stacked upon the other.

12. The invention according to claim 1, and
said roof section having a hook gathering element which is provided with lateral abutment means to limit lateral movement of a roof section when stacked thereupon.

13. A gondola car comprising:
a lower open body portion and an upper removable roof portion releasably mountable thereupon,
said roof portion comprising a plurality of intercoupled roof sections,
each roof section comprising a splice carline overlapping an associated splice carline of another roof section and providing for moisture entrapment and routing of moisture off the roof sections, and
end stake means attached to said one of said end roof sections and extendible into the inside corner of said open car portion for limiting movement of said roof.

14. The invention according to claim 13, and
body portion mounted stop element interposable between the splice carlines for limiting longitudinal movement of the roof sections relative to the car.

15. The invention according to claim 13, and
each of said roof sections carrying swingable lock means adapted to lock the roof sections to the car body.

16. The invention according to claim 13, and
carrying roof stacking means for putting one roof section on the other when uncoupled from the car body.

References Cited

UNITED STATES PATENTS

| | | | |
|---|---|---|---|
| 571,577 | 11/1896 | Richards | 105—377 |
| 1,322,310 | 11/1919 | Kring | 105—377 |
| 2,132,328 | 10/1938 | Tatum | 105—377 |
| 2,202,015 | 5/1940 | Marinello | 296—137 |
| 2,292,251 | 8/1942 | Test et al. | 105—410 |
| 2,674,208 | 4/1954 | Keller et al. | 105—377 |
| 2,949,867 | 8/1960 | Ramsey | 105—377 |
| 2,977,900 | 4/1961 | Farrar | 105—377 |
| 2,978,841 | 4/1961 | Miller | 214—10.5 |
| 2,997,322 | 8/1961 | Cisco et al. | 292—108 |
| 3,327,649 | 6/1967 | Fisher et al. | 105—377 |

ARTHUR L. LA POINT, Primary Examiner

R. A. BERTSCH, Assistant Examiner